United States Patent [19]

Berthelot et al.

[11] 3,819,277
[45] June 25, 1974

[54] PHOTOMETRIC ANALYZER HAVING TWO WAVELENGTHS FOR THE DETERMINATION OF ELEMENTS IN A SOLUTION

[75] Inventors: Guy Berthelot, Ivry sur Seine; Jean Jacques Perez, Chatillon, both of France

[73] Assignee: Commissariat A L'Energie Atomique, Paris, France

[22] Filed: Sept. 20, 1971

[21] Appl. No.: 181,734

[52] U.S. Cl............. 356/204, 200/220 R, 250/233, 350/7, 350/274, 350/299, 356/205, 356/206
[51] Int. Cl............................................ G01n 21/24
[58] Field of Search............. 250/232, 233, 220 SD; 350/266, 7, 273–275, 299; 356/88, 89, 93–97, 204–206, 205, 211, 212

[56] References Cited
UNITED STATES PATENTS

| 3,045,123 | 7/1962 | Frommer............... 250/220 SD X |
| 3,176,576 | 4/1965 | Sundstrom et al........... 356/89 |
| 3,381,135 | 4/1968 | Keller....................... 356/89 X |
| 3,520,614 | 7/1970 | Goldstein................. 356/95 X |
| 3,666,362 | 5/1972 | Chance..................... 356/93 X |
| 3,712,738 | 1/1973 | Yamamoto et al........... 356/93 |

Primary Examiner—John K. Corbin
Assistant Examiner—F. L. Evans
Attorney, Agent, or Firm—Cameron, Kerkam, Sutton, Stowell & Stowell

[57] ABSTRACT

The analyzer comprises a modulator-demodulator system disposed between an optical device which delivers two monochromatic beams having different wavelengths and a detection device which has at least one light detector and two optical paths.

A vessel containing the solution to be analyzed is placed between two plates secured to a motor-driven shaft and both provided with openings disposed in opposite relation. Inclined mirrors adjacent to each alternate opening are mounted in opposite relation in pairs on the outer faces of the plates and their reflecting faces are directed towards the plates.

During rotation of the plates about the shaft the two monochromic light beams pass in alternate sequence and along the same trajectory through the vessel which contains the solution to be analyzed and are then detected by said detection device after each beam has followed one of the optical paths.

6 Claims, 3 Drawing Figures

PHOTOMETRIC ANALYZER HAVING TWO WAVELENGTHS FOR THE DETERMINATION OF ELEMENTS IN A SOLUTION

This invention relates to a photometric analyzer for the determination of elements in a solution by means of two light beams having different wavelengths.

One application for which the analyzer is of particular interest is the simultaneous determination of two elements in one and the same solution.

The analyzer can also be employed to advantage in the determination of a single element in a turbid solution or a solution containing foreign substances; in this case, the invention makes it possible to overcome some of the disadvantages which arise from the use of a conventional spectrophotometer in the continuous or non-continuous testing of industrial solutions.

One of these disadvantages lies in the progressive soiling of the walls of optical circulation vessels by solutions which are never wholly clear; the turbidity of the solutions further results in a grey light-absorption background which varies in time; it is therefore impossible to adjust the zero of the calibration range.

A further disadvantage arises from the presence in industrial solutions of substances other than the substance whose concentration is to be measured. By way of example, these foreign substances are the ionic elements of metallic vessels and pipes (iron, chromium, nickel) which result from corrosion of stainless steel and absorb light at certain wavelengths, thus disturbing the measurement by adding a secondary absorption background which fluctuates in time.

One known method for overcoming these disadvantages consists in reading the optical transmission at a given wavelength (which is chosen so as to be representative of the concentration of the substance to be measured) by taking as a reference the measurement of the same solution in the same vessel but at a different wavelength; this latter is chosen outside the absorption zone of the substance to be measured and at a point at which the solution exhibits the highest degree of transparency; the light waves thus selected pass along the same path and it is therefore possible to eliminate the grey background of the vessel, the turbidity of the solution and the presence of foreign substances.

In its application to the determination of a single element in a solution which is either turbid or contains foreign substances, the analyzer in accordance with the invention carries this method into effect but has a further advantage in that the two measurements are carried out automatically with particularly great ease and a high degree of accuracy.

More precisely, the invention relates to a photometric analyzer having two wavelengths for the determination of elements in a solution, said analyzer being essentially characterized in that it comprises an optical device for delivering two monochromatic beams having different wavelengths, a detection device comprising at least one light detector and two optical paths and a modulator-demodulator system interposed between said optical device and said detection device and comprising on the one hand two plates which are secured to a motor-driven shaft and between which is placed a vessel containing the solution to be studied, each of said plates being pierced by openings disposed at intervals on a circumference which is centered on said shaft and each opening of one plate being intended to correspond to an opening formed in the other plate and located on a same line parallel to said shaft and on the other hand on each plate and at each alternate opening an inclined mirror which is fixed in the plate on that face of said plate which is external to the interval between the two plates, the reflecting face of said mirror being directed towards the plate, each mirror which is placed in relation to one opening of a plate being intended to correspond to a mirror of the opening formed in the other plate and located on a same line parallel to said shaft, the arrangement being such that during rotation of said plates about said shaft the two monochromatic light beams pass in alternate sequence and along the same trajectory through the vessel which contains the solution to be studied and are then detected by said detection device after each beam has followed one of said optical paths.

The optical device which delivers the two beams is preferably constituted by a light source, two elements for selecting light having different wavelengths and a semi-reflecting mirror having a variable coefficient of attenuation which is positionally adjustable but has a constant orientation and is disposed downstream of said source, the design function of said mirror being to separate the light beam emitted by said source into two beams which are directed respectively towards each of said light-selecting elements and to balance the light intensities distributed between said two beams.

Further properties and advantages of the invention will become apparent from the following description which is given with reference to the accompanying drawings and in which one form of construction of the photometric analyzer in accordance with the invention is given by way of explanation but not in any limiting sense and corresponds to the case of determination of a single element in a solution.

Figure 1:
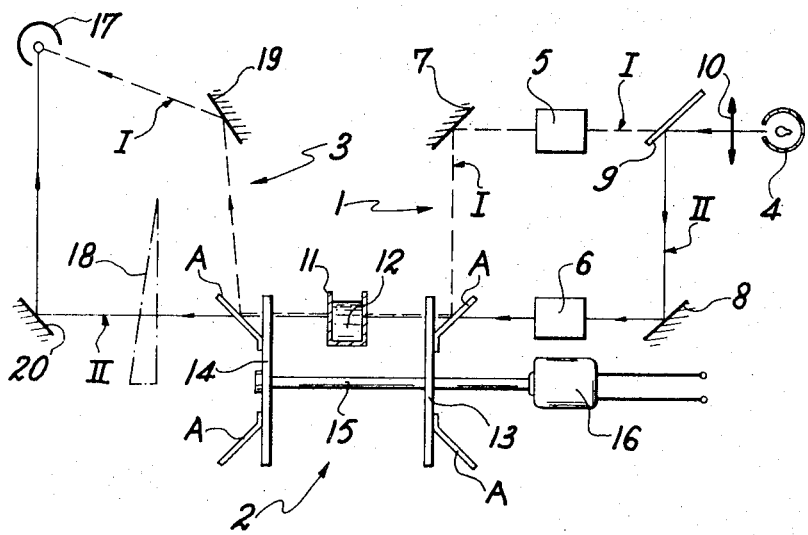
FIG. 1 is a diagram of the complete photometric analyzer in accordance with the invention.

As shown in FIG. 1, the analyzer in accordance with the invention is essentially made up of a modulator-demodulator system 2 which is interposed between an optical device 1 for delivering two monochromatic beams I and II and a detection device 3.

In accordance with the essential feature of the invention, the two beams I and II having different wavelengths are admitted into the modulator-demodulator system 2 which serves to pass these two beams alternately through a vessel 11 containing the solution 12 to be measured.

Figure 2:
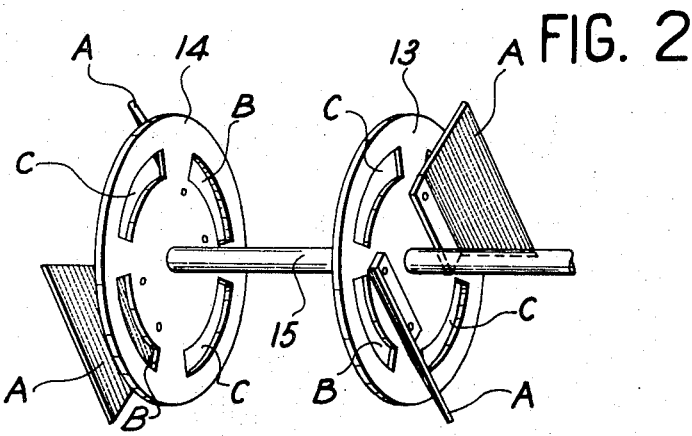
FIG. 2 shows alone and in perspective the modulator-demodulator system of said analyzer.

Said modulator-demodulator system which is illustrated in detail in FIG. 2 is constituted by two plates 13, 14 in the form of discs mounted on a shaft 15 which is driven by a motor 16. Said two discs 13, 14 are each provided symmetrically with two mirrors A and with four openings (two openings B and two openings C) which are arranged so as to ensure on the one hand in the case of the disc 13 that the incident beam I should be reflected from the mirrors A, then transmitted through the corresponding openings B to the vessel 11 and that, similarly, the incident beam II should be transmitted through the openings C to said vessel in alternate relation to the beam I and in order to ensure on the other hand in the case of the disc 14 that the two beams I AND II should be separated once again in order to be returend to the detection device 3.

The optical device 1 which supplies the modulator-demodulator system 2 comprises a light source 4, a condenser 10, two elements 5 and 6 for selecting light having different wavelengths, two mirrors 7 and 8 and a semi-reflecting mirror 9 having a variable coefficient of attenuation which is inclined at an angle of 45° to the beam emitted by the source 4.

The light derived from the assembly 4-10 (lamp, light condenser) is split up into two beams I and II (which consist of a measuring beam I and a reference beam II in the case of application of the analyzer to determination of a single element in the solution of vessel 11) by means of the mirror 9. In addition to splitting up into two beams, said mirror also ensures perfect balancing of the light intensities which are distributed between these two beams: in order to achieve this state of balance, it is only necessary to displace the mirror 9 longitudinally at an angle of 45° to the incident beam; the more or less attenuated reflection and transmission combine to provide higher flexibility in the adjustment of the light intensities which are available at the level of the light selectors 5 and 6. These selectors can be monochromators (prisms, gratings) or simply filters. Since the coefficient of transmission of commercially available filters is fairly variable from one filter to the other (especially when said filters have different wavelengths), the system of adjustment of light intensities by means of the mirror 9 is therefore particularly advantageous.

In the case of application of the analyzer to the determination of two elements in the solution of vessel 11, the beams I and II are measuring beams and each correspond to one of these two elements.

Downstream of the modulator-demodulator system 2, the detection device 3 is constituted as follows:

a. in the case of application of the analyzer to the determination of a single element in the solution of vessel 11, the detection device comprises only a single light detecotr 17.

In the case of an analyzer of the optical compensation type, an attenuator system 18 or photometric wedge is placed at the exit of the system 2 and can advantageously be controlled by a system fitted with a servo-mechanism (not illustrated). The reference numerals 19 and 20 designate two mirrors.

Figure 3:
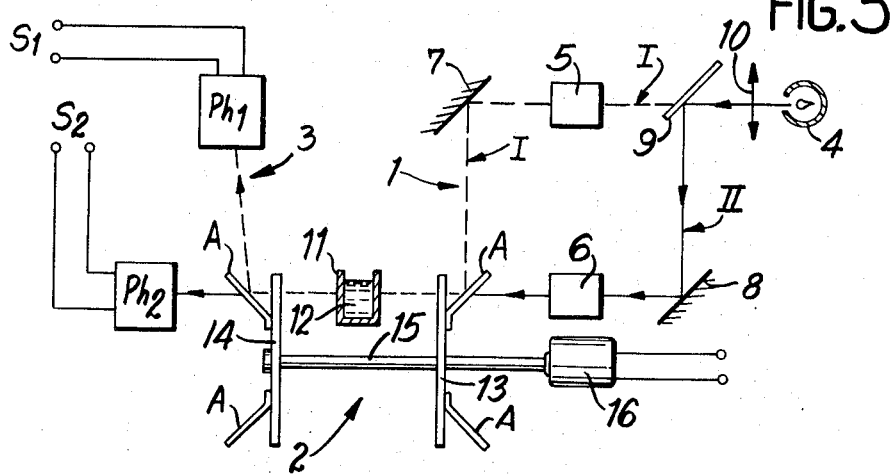
FIG. 3 is a diagram similar to that of FIG. 1 but showing photoelectric cells for the analygens.

In the case of an analyzer of the deviation type, use can be made of two photoelectric measuring cells (shown in FIG. 3 at Ph1 and Ph2) which are mounted in opposition and disposed respectively on the beams I and II at the point of delivery of these latter from the modulator-demodulator system 2.

b. in the case of application of the analyzer to the simultaneous determination of two elements in the solution of vessel 11, the detection device 3 is double; in other words, the device comprises one detector for each of the beams I and II which are derived from the modulator-demodulator system 2 and which each correspond to one of the two elements to be determined in the solution of vessel 11.

The analyzer according to the invention has the advantage of being of simple constructional design and of dispensing with the need for regulating the synchronism between a modulator and a demodulator. The device ensures perfect coincidence of the two beams as these latter pass through the vessel. In the case of determination of a single element within the vessel, the device permits optical balancing of the two beams by virute of their spatial separation at the entrance of the modulator so that the detector can be operated in its zone of linearity in the case of both wavelengths.

Moreover, the analyzer in accordance with the invention makes it possible by virtue of the spatial separation of the two beams at the exit of the modulator-demodulator system 2 to employ a double detector and consequently to carry out the determination of two elements in the same solution.

What we claim is:

1. A photometric analyzer having two wavelengths for the determination of elements in a solution, wherein said analyzer essentially comprises an optical device for delivering two monochromatic beams having different wavelengths, a detection device comprising at least one light detector and two optical paths and a modulator-demodulator system interposed between said optical device and said detection device and comprising two plates secured to a motor-driven shaft and between which is placed a vessel containing the solution to be studied, each of said plates being pierced by openings disposed at intervals on a circumference which is centered on said shaft and each opening of one plate corresponding to an opening formed in the other plate and located on a same line parallel to said shaft and on each plate and at each alternate opening an inclined mirror fixed in the plate on that face of said plate which is external to the interval between the two plates and the reflecting face of said mirror being directed towards the plate, each mirror which is adjacent to one opening of a plate corresponding to a mirror of the opening formed in the other plate and located on a same line parallel to said shaft, the arrangement being such that during rotation of said plates about said shaft the two monochromatic light beams pass in alternate sequence and along the same path through the vessel which contains the solution to be studied and are then detected by said detection device after each beam has followed one of said optical paths.

2. A photometric analyzer in accordance with claim 1, wherein the optical device which delivers the two beams is constituted by a light source, two elements for selecting light having different wavelengths and a semi-reflecting mirror having a variable coefficient of attenuation which is positionally adjustable but has a constant orientation and is disposed downstream of said source, said mirror separating the light beam emitted by said source into two beams which are directed respectively towards each of said light-selecting elements and to balance the light intensities distributed between said two beams.

3. A photometric analyzer in accordance with claim 1 as applied to the determination of a single element in the vessel containing the solution to be studied and wherein including within the detection device and at the exit of the modulator-demodulator system a photometric wedge to balance the light intensity between the two monochromatic beams which are respectively a reference beam and a measuring beam.

4. A photometric analyzer in accordance with claim 3, wherein said photometric wedge is controlled by a servo-mechanism.

5. A photometric analyzer in accordance with claim 1 as applied to the determination of a single element in the solution of the vessel, wherein the detection device at the exit of the modulator-demodulator system includes two measuring photoelectric cells mounted in opposition and disposed respectively on the paths of the measuring beam and of the reference beam.

6. A photometric analyzer in accordance with claim 1 as applied to the determination of two elements in the solution of the vessel, wherein the detection device is double and includes one detector for each of the beams derived from the modulator-demodulator system, each beam corresponding to one of said two elements.

* * * * *

CERTIFICATE OF CORRECTION

Patent No. 3,819,277     Dated June 25, 1974

Inventor(s) Guy BERTHELOT and Jean Jacques PEREZ

It is certified that error appears in the above-identified patent and that said Letters Patent are hereby corrected as shown below:

Foreign Application Priority Data

September 23, 1970    France . . . . . . . . . . 7034443

Signed and sealed this 29th day of October 1974.

(SEAL)
Attest:

McCOY M. GIBSON JR.
Attesting Officer

C. MARSHALL DANN
Commissioner of Patents